(12) United States Patent
Yamanaka (10) Patent No.: US 7,866,436 B2
(45) Date of Patent: Jan. 11, 2011

(54) STEERING APPARATUS FOR MOTOR VEHICLE

(75) Inventor: Kosuke Yamanaka, Kashihara (JP)

(73) Assignee: JTEKT Corporation, Osaka (JP)

( * ) Notice: Subject to any disclaimer, the term of this patent is extended or adjusted under 35 U.S.C. 154(b) by 50 days.

(21) Appl. No.: 12/289,130

(22) Filed: Oct. 21, 2008

(65) Prior Publication Data

US 2009/0101431 A1  Apr. 23, 2009

(30) Foreign Application Priority Data

Oct. 22, 2007  (JP) ............................. 2007-274469

(51) Int. Cl.
*B62D 5/04* (2006.01)

(52) U.S. Cl. ..................... 180/444; 180/443; 180/428; 180/440

(58) Field of Classification Search ................. 180/444, 180/443, 428, 440
See application file for complete search history.

(56) References Cited

U.S. PATENT DOCUMENTS

| | | | | |
|---|---|---|---|---|
| 6,575,265 | B2 * | 6/2003 | Richardson et al. | 180/444 |
| 6,896,090 | B2 * | 5/2005 | Kanda et al. | 180/402 |
| 2002/0029922 | A1 * | 3/2002 | Richardson et al. | 180/444 |
| 2003/0201136 | A1 * | 10/2003 | Ueno et al. | 180/443 |
| 2005/0288142 | A1 * | 12/2005 | Yamanaka et al. | 475/4 |
| 2007/0209861 | A1 * | 9/2007 | Kruttschnitt et al. | 180/444 |
| 2007/0261909 | A1 * | 11/2007 | Higashi et al. | 180/446 |
| 2008/0073143 | A1 * | 3/2008 | Yamanaka | 180/444 |
| 2008/0264714 | A1 * | 10/2008 | Morikawa | 180/446 |
| 2008/0277192 | A1 * | 11/2008 | Nishimura | 180/444 |

FOREIGN PATENT DOCUMENTS

| | | |
|---|---|---|
| EP | 1 693 599 A1 | 8/2006 |
| EP | 1 857 347 A2 | 11/2007 |
| EP | 1 902 925 A2 | 3/2008 |
| FR | 2 894 549 | 6/2007 |
| JP | 2005-343205 | 12/2005 |

* cited by examiner

*Primary Examiner*—Lesley Morris
*Assistant Examiner*—Tashiana Adams
(74) *Attorney, Agent, or Firm*—Rabin & Berdo, PC (57) ABSTRACT

A planet gear mechanism 19 interposed between a steering 2 and steerable wheels 4L and 4R is interposed. A torque controlling motor 25 for controlling a torque acting on the steering 2 and a transmission-rate varying motor 20 for driving the planet gear mechanism 19 are arranged coaxially (on an axial A) with the planet gear mechanism 19. This eliminates the need for arranging each motor 20 and 25 on the both ends of the axis A to face each other, and also reduces a space occupied by the motors 20 and 25 with respect to a radial direction of the axis A. As a result, reduction in the size of an apparatus can be achieved.

6 Claims, 5 Drawing Sheets

FIG. 5

STEERING APPARATUS FOR MOTOR VEHICLE

BACKGROUND OF THE INVENTION

1. Field of the Invention

The present invention relates to a steering apparatus for a motor vehicle.

2. Description of Related Art

In steering apparatuses for a motor vehicle, there is one which is mounted with a system capable of varying a ratio (transmission ratio) of a steered angle of steerable wheels with respect to a steering angle of a steering member (for example, Patent Document D1: Japanese Published Unexamined Patent Application No. 2005-343205).

In Patent Document D1, there is shown a configuration provided with a first shaft interconnected to a steering wheel, a second shaft interconnected to wheels, and a planet gear mechanism for interconnecting the first and second shafts so as to permit rotation transmission therebetween. The planet gear mechanism includes: a first sun gear fixed to the first shaft; a second sun gear fixed to the second shaft, a plurality of pinions arranged on a periphery of the first and second shafts, and ring members surrounding the pinions. The rotation of the steering member is transmitted to the first shaft, the first sun gear, the pinions, the second sun gear, and the second shaft, in this order, and finally transmitted to the wheels.

A transmission ratio (a ratio of a rotational speed between the first sun gear and the second sun gear) in the planet gear mechanism can be varied by imparting rotation from a first motor to the ring member. More specifically, output of the first motor is transmitted to the ring member via a small gear interconnected to an output shaft of the first motor and a tooth portion formed at an outer periphery of the ring member and meshed with the small gear. Thereby, the rotational speed of the ring member is varied.

In addition to the first motor, the second motor is provided. When output of the second motor is transmitted to the first shaft via a reduction mechanism formed by a small gear and a large gear to the first shaft, torque acting on the steering member is controlled.

However, in the case of Patent Document D1, the first and second motors are arranged to face each other by sandwiching a steering shaft therebetween(61 and 62 in FIG. 1 in Patent Document 1), and housings of these motors protrude in a radial direction of the steering shaft, which results in increasing the size of the apparatus.

SUMMARY OF THE INVENTION

The present invention has been achieved in view of such a background, and an object thereof is to reduce the size of a steering apparatus for a motor vehicle.

In this section, numbers, etc., in brackets represent reference numerals of the corresponding constituent elements in the following embodiment. However, it is not intended to limit the scope of the claims by these reference numerals.

To achieve the aforementioned object, a steering apparatus for a motor vehicle (1) of the present invention includes: a differential mechanism (19) that arranges coaxially an input shaft (13) interconnected to a steering member (2) and an output shaft (14) interconnected to steerable wheels (4L and 4R) so as to set a transmission ratio from the input shaft to the output shaft; a torque controlling motor (25) interconnected to the input shaft (13); and a transmission-ratio varying motor (20), interconnected to the differential mechanism, for driving the differential mechanism.

A position of at least one portion of one or both of the torque controlling motor (25) and the transmission-ratio varying motor (20) overlaps a portion of the differential mechanism (19) with respect to a direction (S) along an axis (A) of the input shaft. The torque controlling motor (25) is arranged coaxially with the input shaft (13), and the transmission-ratio varying motor (20) is arranged coaxially with the differential mechanism (19).

According to the configuration, both the torque controlling motor (25) and the transmission-ratio varying motor (20) can be formed to be in an annular shape that is concentric to the input shaft (13) and the output shaft (14). This eliminates the need for arranging each motor to face each other on the both sides of the input shaft (13) and the output shaft (14), and thus, a space occupied by these motors can be reduced with respect to a radial direction (R) of the input shaft (13). As a result, reduction in the size of the apparatus can be achieved. A position of at least one portion of one or both of the torque controlling motor (25) and the transmission-ratio varying motor (20) overlaps a portion of the differential mechanism (19) with respect to a direction along an axis of the input shaft (13), and thereby, an entire length of the apparatus with respect to the direction along the axis can be shortened. As a result, a further reduction in the size of the apparatus can be achieved.

In the present invention, the differential mechanism (19) includes a planet transmission mechanism (19) having: a first sun element (21) interconnecting to the input shaft (13); a second sun element (22) interconnecting to the output shaft (14); a planet element (23) engaging with both the first sun element (21) and the second sun element (22) so as to permit rotation transmission therebetween; and a carrier member (24) for holding the planet element (23) so as to permit rotation and so as to permit revolution around the first sun element and the second sun element, and the transmission-ratio varying motor (20) may serve to drive the carrier member (24). In this case, the first sun element (21) and the second sun element (22) are to be arranged on the inside of an orbital revolution of the planet element (23). Thereby, the planet transmission mechanism (19) can be reduced in size.

In the present invention, on the inside of an outer cylinder portion (41) of a rotor (251) of the torque controlling motor (25), an annular groove (44) is defined, and in the annular groove (44), at least one portion of the differential mechanism (19) is sometimes accommodated. In this case, the torque controlling motor (25) is able to surround at least one portion of the differential mechanism (19), and thus, the apparatus can be reduced in size with respect to the axial direction. Further, the torque controlling motor (25) can be used as a sound-proof member for preventing propagation of a drive noise of the differential mechanism (19), and thus, the noise of the apparatus can be decreased.

In the present invention, the carrier member (24) may be that which includes: a first end wall (53) for axially supporting one end of the planet element (23) and a second end wall (54) for axially supporting an alternate end of the planet element (23), and further includes an encircling member (56), arranged between the first end wall (53) and the second end wall (54), for encircling liquid-tightly the first sun element (21), the second sun element (22), and the planet element (23). Thereby, it is possible to prevent lubricant applied to each element (21) to (23) of the differential mechanism (19) from splattering, and thus, the lubrication of the differential mechanism (19) can be maintained for a long period of time.

The above-described and/or other advantages, characteristics, and effects of the present invention will be made clear from the description of the embodiment below with reference to the attached drawings.

DETAILED DESCRIPTION OF PREFERRED EMBODIMENTS

Figure 1:
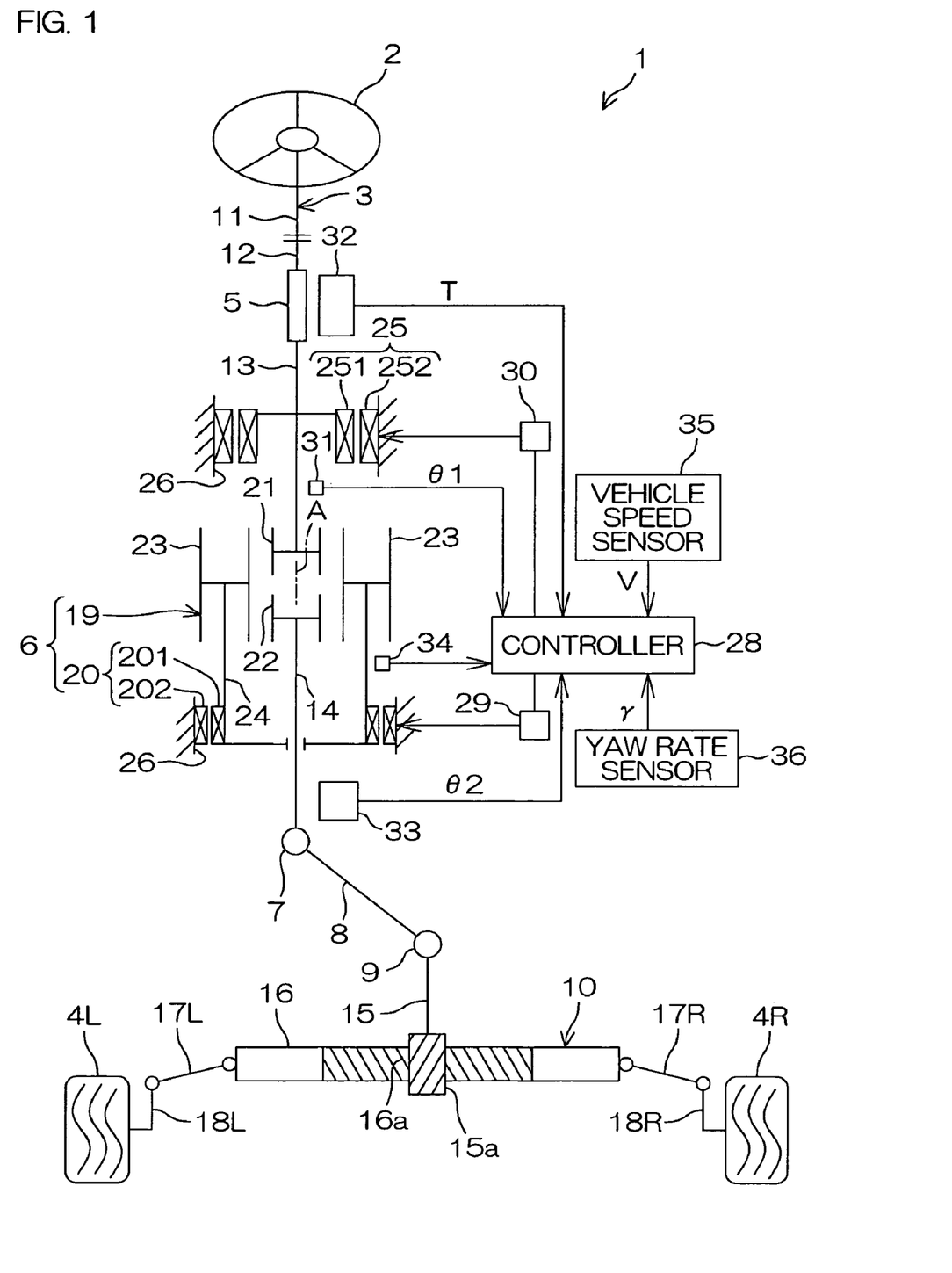
FIG. 1 is a diagram showing a schematic configuration of a steering apparatus for a motor vehicle according to one embodiment of the present invention.

FIG. 1 is a diagram showing a schematic configuration of a steering apparatus for a motor vehicle 1 according to one embodiment of the present invention.

The steering apparatus for a motor vehicle 1 applies a steering torque imparted to a steering member 2 such as a steering wheel to each of right and left steerable wheels 4R and 4L via a steering shaft 3, etc., as a steering shaft, so as to turn the steering wheel. The steering apparatus for a motor vehicle 1 has a VGR (Variable Gear Ratio) function capable of varying a transmission ratio $\theta 2/\theta 1$, which is a ratio of a steered angle $\theta 2$ of the steerable wheels with respect to a steering angle $\theta 1$ of the steering member 2.

The steering apparatus for a motor vehicle 1 includes the steering member 2 and the steering shaft 3 interconnecting to the steering member 2. The steering shaft 3 is formed by first to fourth shafts 11 to 14 arranged coaxially with respect to each other. An axis of the steering shaft 3 is aligned with an axis A of the first to fourth shafts 11 to 14.

One end of the first shaft 11 is interconnected rotatably together with the steering member 2. The other end of the first shaft 11 and one end of the second shaft 12 are interconnected rotatably together with each other. The other end of the second shaft 12 and one end of the third shaft 13 are interconnected relatively rotatably with each other via a torsion bar 5 within a predetermined range.

The other end of the third shaft 13 and one end of the fourth shaft 14 are differentially rotatably interconnected to each other via a transmission-ratio variable mechanism 6. The other end of the fourth shaft 14 is connected to the steerable wheels 4R and 4L via a universal joint 7, an intermediate shaft 8, a universal joint 9, and a steering mechanism 10.

The steering mechanism 10 includes: a pinion shaft 15 interconnecting to the universal joint 9; a rack shaft 16, as a steerable shaft extending in right and left directions of a motor vehicle, provided with a rack 16a meshed with a pinion 15a at the distal end of the pinion shaft 15 and; knuckle arms 18R and 18L each interconnected via tie rods 17R and 17L to a pair of ends of the rack shaft 16.

With the aforementioned configuration, the rotation of the steering member 2 is transmitted to the steering mechanism 10 via the steering shaft 3, etc. In the steering mechanism 10, the rotation of the pinion 15a is converted into a motion in an axial direction of the rack shaft 16, and via the respective tie rods 17R and 17L, the corresponding knuckle arms 18R and 18L are respectively turned. Thereby, the corresponding steerable wheels 4R and 4L interconnected to the respective knuckle arms 18R and 18L are respectively steered.

The transmission-ratio variable mechanism 6 serves to vary a rotation transmission ratio (transmission ratio $\theta 2/\theta 1$) between the third and fourth shafts 13 and 14 of the steering shaft 3. The transmission-ratio variable mechanism 6 includes: a planet gear mechanism 19, as a differential mechanism, for differentially rotatably interconnecting the third and fourth shafts 13 and 14; and a transmission-ratio varying motor 20 for driving the planet gear mechanism 19.

The planet gear mechanism 19 configures a planet transmission mechanism. The planet gear mechanism 19 includes: a first sun gear 21 interconnected rotatably together with the third shaft 13; a second sun gear 22 arranged opposite to each other with the first sun gear 21 and interconnected rotatably together with the fourth shaft 14; planet gears 23 engaging with both the first and second sun gears 21 and 22 so as to permit rotation transmission therebetween; and a carrier member 24 for holding the planet gears 23 so as to permit rotation around axes thereof and to permit revolution around the axis (axis A) of the first and second sun gears 21 and 22.

The third shaft 13 configures an input shaft interconnecting to the steering member 2, and the fourth shaft 14 configures an output shaft interconnecting to the steerable wheels 17R and 17L.

The first and second sun gears 21 and 22 and the planet gears 23 are each formed by using a spiral gear, for example, and the respective planet gears 23 are meshed with each of the sun gears 21 and 22. Instead of the spiral gear, other gears having parallel axes such as a helical gear and a spur gear may be used.

The planet gears 23 serve to associate the first and second sun gears 21 and 22 with each other, and a plurality (in this embodiment, two) of planet gears 23 are arranged with equal spacing in a circumferential direction of the steering shaft 3. An axis of each planet gear 23 is arranged parallel to the axis A of the steering shaft 3.

The carrier member 24 can rotate about the axis A of the steering shaft 3. In each planet gear 23, the number of teeth in a portion meshed with the first sun gear 21 and the number of teeth in a portion meshed with the second sun gear 22 are identical.

The number of teeth of the first sun gear 21 and that of the second sun gear 22 differ from each other. At least one (for example, the second sun gear 22) of the first sun gear 21 and the second sun gear 22 is formed by using a profile shifted gear. This profile shifted gear is a negative profile shifted gear shifted in a direction where a diameter of a pitch circle becomes smaller or a positive profile shifted gear shifted in a direction where it becomes larger.

The transmission-ratio varying motor 20 serves to rotate and drive the carrier member 24, and varies the rotational speed with respect to the carrier member 24 about the axis A to vary the transmission ratio $\theta 2/\theta 1$.

The transmission-ratio varying motor 20 is formed by a brushless motor arranged coaxially with both the planet gear mechanism 19 and the steering shaft 3, for example. The transmission-ratio varying motor 20 includes a rotor 201 interconnected rotatably together with the carrier member 24 and a stator 202 surrounding the rotor 201 and fixed to a housing 26.

The steering apparatus for a motor vehicle 1 is provided with a torque controlling motor 25 for compensating a steering reaction force (steering torque) of the steering member 2 in association with an operation of the transmission-ratio variable mechanism 6. The torque controlling motor 25 is formed by a brushless motor arranged coaxially with the steering shaft 3, for example. That is, both the torque controlling motor 25 and the transmission-ratio varying motor 20 are arranged coaxially with the steering shaft 3.

The torque controlling motor 25 includes a rotor 251 interconnected rotatably together with the third shaft 13 and a stator 252 surrounding the rotor 251 and fixed to the housing 26.

Driving of the transmission-ratio varying motor 20 and the torque controlling motor 25 are each controlled by a controller 28 including a CPU, a RAM, and a ROM. The controller 28 is connected to the transmission-ratio varying motor 20 via a drive circuit 29, and connected to the torque controlling motor 25 via a drive circuit 30.

The controller 28 is respectively connected to: a steering-angle sensor 31; a torque sensor 32; a steered-angle sensor 33; a carrier-member rotation-angle sensor 34; a vehicle speed sensor 35; and a yaw rate sensor 36.

From the steering-angle sensor 31 to the controller 28, a value corresponding to the steering angle $\theta 1$, which is an operation amount from a straight-ahead position of the steering member 2, i.e., a signal indicating the rotation angle of the third shaft 13, is input. From the torque sensor 32 to the controller 28, a value corresponding to a steering torque T acting on the steering member 2, i.e., a signal indicating a torque acting between the second shaft 12 and the third shaft 13, is input. From the steered-angle sensor 33 to the controller 28, a value corresponding to the steered angle $\theta 2$, i.e., a signal indicating the rotation angle of the fourth shaft 14, is input. From the carrier-member rotation-angle sensor 34 to the controller 28, a signal regarding the rotation angle of the carrier member 24 is input. From the vehicle speed sensor 35 to the controller 28, a signal about a vehicle speed V is input. From the yaw rate sensor 36 to the controller 28, a signal regarding a yaw rate Y of a motor vehicle is input.

Based on the signals of each sensor 31 to 36, the controller 28 controls the driving of the transmission-ratio varying motor 20 and the torque controlling motor 25.

Figure 2:
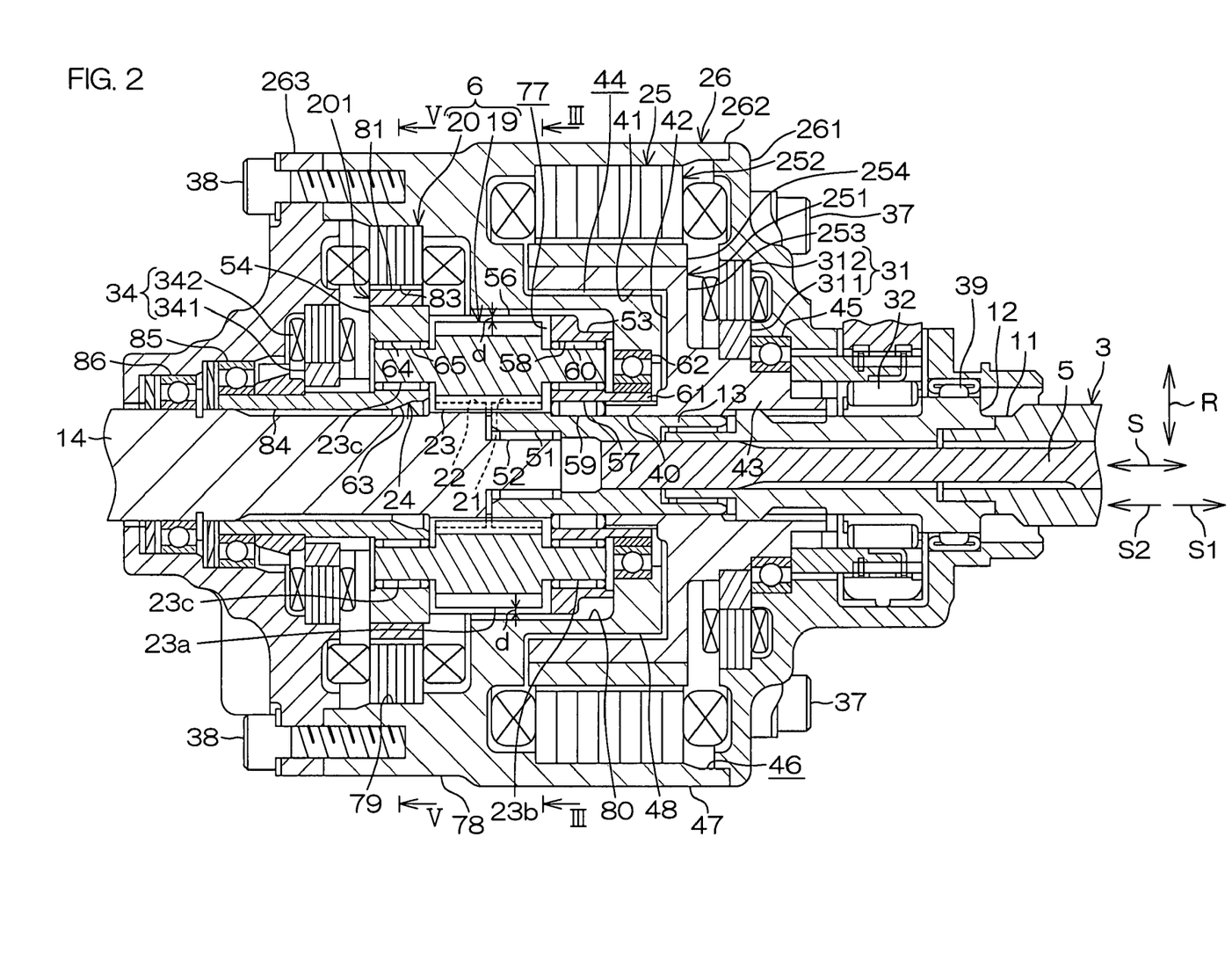
FIG. 2 is a cross-sectional view showing a more specific configuration of main parts in FIG. 1.

FIG. 2 is a cross-sectional view showing a more specific configuration of main parts of FIG. 1. With reference to FIG. 2, the first shaft 11, the torsion bar 5, the second shaft 12, the third shaft 13, the transmission-ratio variable mechanism 6, the fourth shaft 14, etc., are accommodated inside the housing 26.

The housing 26 is a tubular member supported by a vehicle body (not shown), and is formed by using an aluminum alloy, for example. The housing 26 includes first to third potions 261 to 263 each formed tubularly. One end of the first portion 261 surrounds one end side of the torsion bar 5, and the other end of the first portion 261 surrounds the other end side of the torsion bar 5.

The other end of the first portion 261 and one end of the second portion 262 are mutually coupled by using a plurality of bolts 37 being fastening members. The other end of the second portion 262 and one end of the third portion 263 are mutually coupled by using a plurality of bolts 38 being fastening members.

The first portion 261 of the housing 26 freely rotatably supports the one end of the second shaft 12, via a first bearing 39 formed by a rolling bearing such as a needle roller bearing.

The second portion 262 of the housing 26 accommodates the torque controlling motor 25, the transmission-ratio variable mechanism 6, etc. The rotor 251 of the torque controlling motor 25 includes an annular rotor core 253 and a permanent magnet 254 coupled rotatably together with an outer periphery of the rotor core 253.

The rotor core 253 includes: annular inner cylinder portion 40 and outer cylinder portion 41; an interconnecting portion 42 for interconnecting the inner cylinder portion 40 and the outer cylinder portion 41 to each other; and an extended portion 43 extended from the interconnecting portion 42.

The inner cylinder portion 40 of the rotor core 253 is fixedly fitted onto the third shaft 13 by pressing and so on, and is rotatable together with the third shaft 13.

The outer cylinder portion 41 of the rotor core 253 is opposite with the inner cylinder portion 40 in a radial direction R, and with respect to the inner cylinder portion 40, projects onto the other side S2 of the axial direction S (a direction along the axis of the input shaft. This direction may also be simply referred to as a shaft direction S) of the steering shaft 3.

The interconnecting portion 42 of the rotor core 253 serves to connect the respective one ends of the inner cylinder portion 40 and the outer cylinder portion 41 with each other, and configures an annular wall. By the inner cylinder portion 40, the outer cylinder portion 41, and the interconnecting portion 42, an annular groove 44 is formed on the inside of the outer cylinder portion 41 of the rotor 251.

In the annular groove 44, of which the one side S1 in the axial direction S is closed and the other side S2 in the axial direction S is opened, forms an accommodation space for accommodating therein at least a part of the planet gear mechanism 19.

The extended portion 43 is a cylindrical portion extending from the interconnecting portion 42 to the one side S1 in the axial direction S. The extended portion 43 is supported freely rotatably by the first portion 261 of the housing 26 via a second bearing 45 formed by a rolling bearing such as a deep groove ball bearing. The extended portion 43 is interconnected rotatably together with the rotor 311 of the steering-angle sensor 31. A stator 312 of the steering-angle sensor 31 is held by the first portion 261 of the housing 26 to surround the outer periphery of a rotor 311 thereof.

Figure 3:
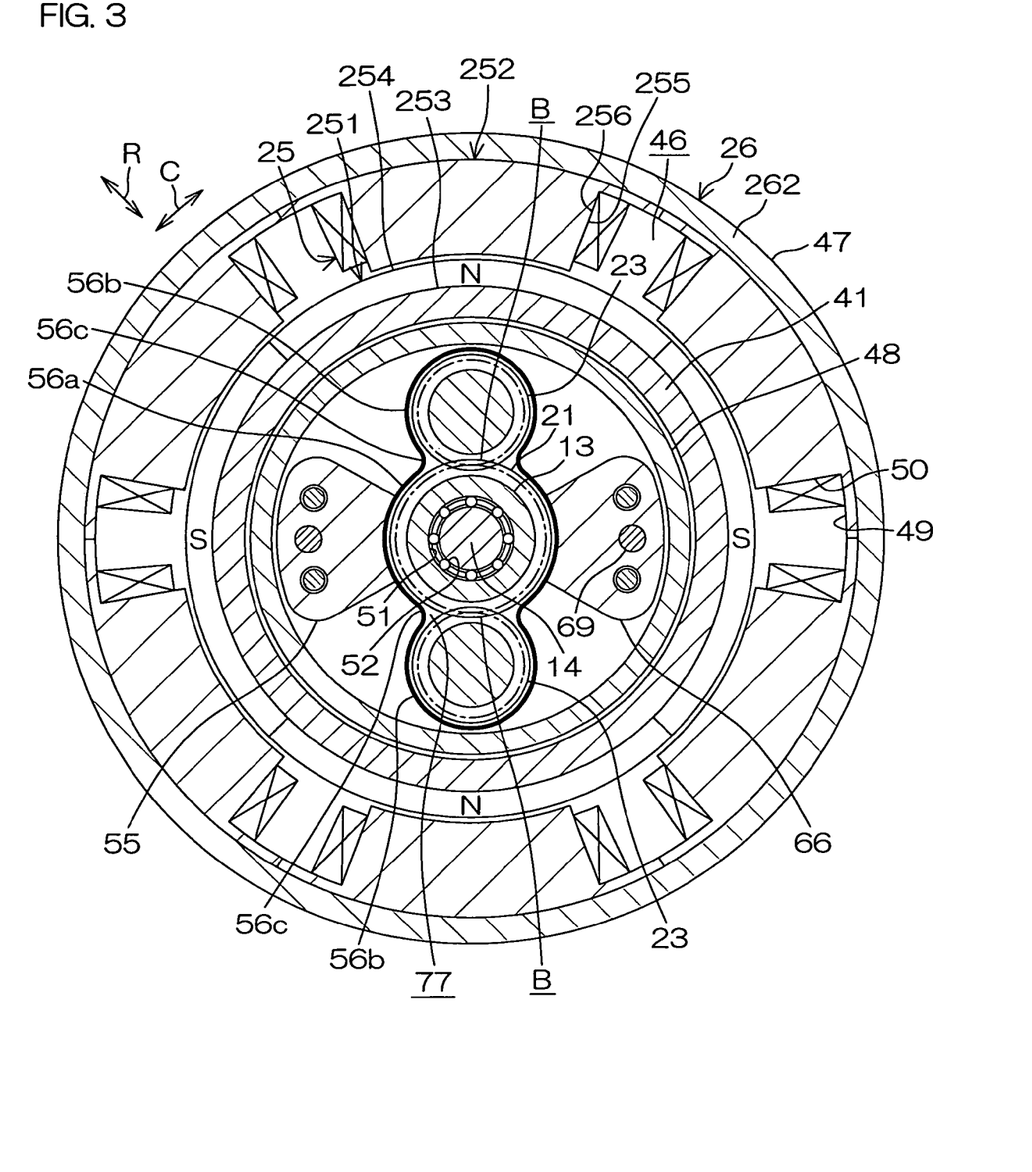
FIG. 3 is a cross-sectional view taken along line III to III of FIG. 2.

FIG. 3 is a cross-sectional view taken along line III to III of FIG. 2. With reference to FIG. 2 and FIG. 3, the permanent magnet 254 of the rotor 251 of the torque controlling motor 25 has magnetic poles of which the polarities alternately differ with respect to a circumferential direction C (hereinafter, may also be simply referred to as a circumferential direction C) of the steering shaft 3, and is arranged with N-poles and S-poles one after another with equal spacing with respect to the circumferential direction C. The permanent magnet 254 is fixed to the outer cylinder portion 41 of the rotor core 253. The permanent magnet 254 may be a segment magnet in which a plurality of circular-arc magnets are annularly arranged, or an annular ring magnet.

With respect to the axial direction S, the permanent magnet 254 extends across an overall area of the outer cylinder portion 41 of the rotor core 253 (FIG. 2). The permanent magnet 254 and the outer cylinder portion 41 of the rotor core 253 are accommodated in a first groove 46 described later.

The stator 252 of the torque controlling motor 25 is accommodated inside the first annular groove 46 formed in the second portion 262 of the housing 26, and the second portion 262 serves also as the housing of the torque controlling motor 25. The first groove 46 is defined by a first annular portion 47 and a second annular portion 48 of the second portion 262 of the housing 26, and is opened toward the one side S1 of the axial direction S.

The first annular portion 47 configures one portion of an outer peripheral wall of the second portion 262. The second annular portion 48 is located radially and inwardly of the first annular portion 47.

The stator 252 of the torque controlling motor 25 includes a stator core 255 formed by stacking a plurality of layers of electromagnetic steel plates in the axial direction S, and an electromagnetic coil 256.

The stator core 255 includes a torus-shaped yoke 49 and a plurality of teeth 50 arranged in a circumferential direction of the yoke 49 with equal spacing and projecting from the yoke 49 inwardly of the radial direction R (hereinafter, may also be simply referred to as a radial direction R) of the steering shaft 3. An outer peripheral surface of the yoke 49 is fixed by being shrink-fit, for example, to an inner peripheral surface of the first annular portion 47 of the housing 26. The teeth 50 are arranged in the circumferential direction C with equal spacing. The electromagnetic coil 256 is wound around each of the teeth 50. Each of the teeth 50 faces the permanent magnet 254 across an overall area of the axial direction S.

The planet gear mechanism 19 of the transmission-ratio variable mechanism 6 is described in detail. The first sun gear 21 is formed integrally with the third shaft 13 by using a single member, and is located at the other end of the third shaft 13. The second sun gear 22 is formed integrally with the fourth shaft 14 by using a single member, and is located at one end of the fourth shaft 14.

One end of the fourth shaft 14 is inserted to an insert hole 51 formed at the other end of the third shaft 13. The fourth shaft 14 can rotate freely relative to the third shaft 13 via a third bearing 52 formed by a rolling bearing such as a roller bearing.

Figure 4:
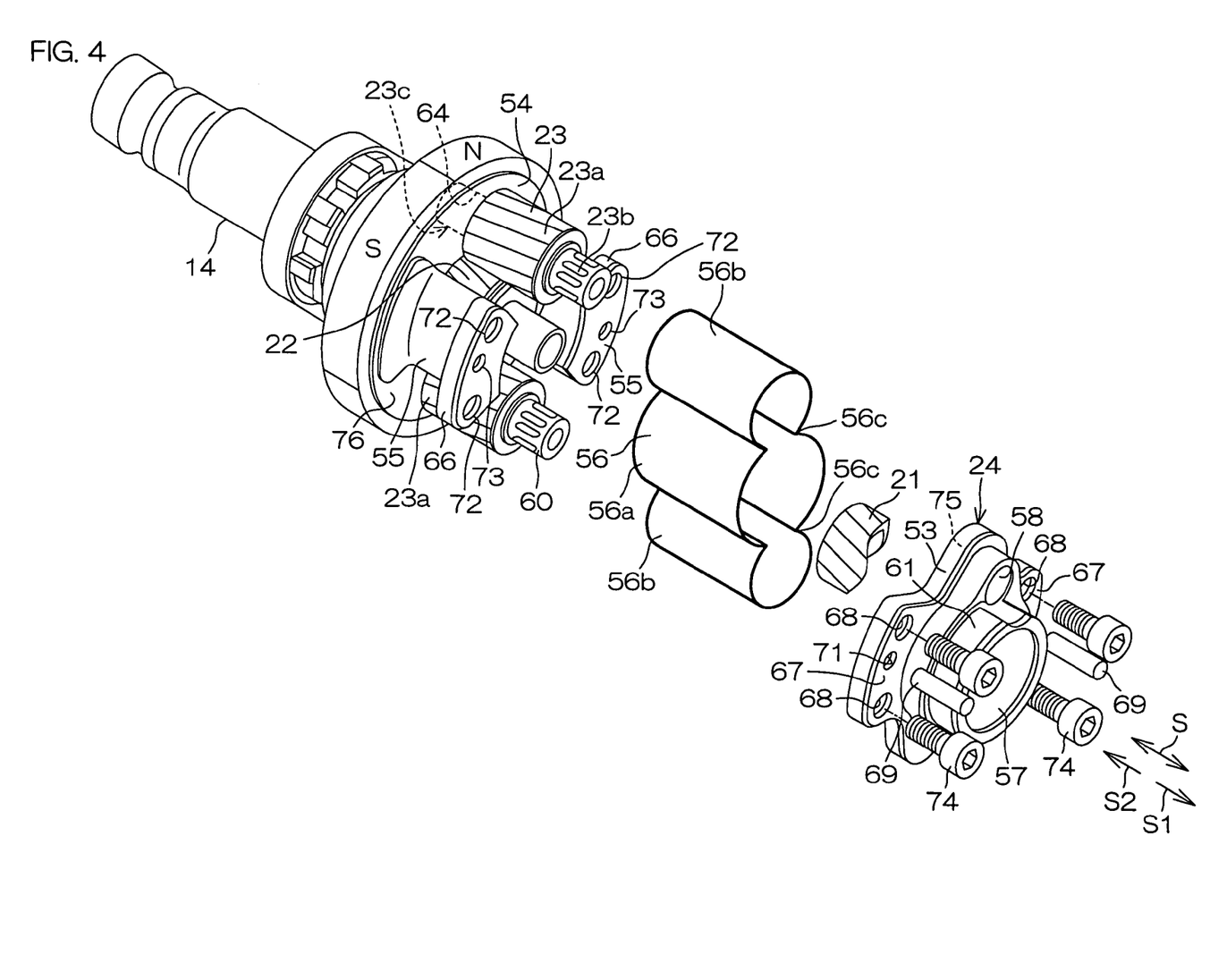
FIG. 4 is an exploded perspective view showing main parts around a carrier member.

FIG. 4 is an exploded perspective view of main parts around the planet gear 23 and the carrier member 24. Each planet gear 23 includes a tooth portion 23a meshed with both the first and second sun gears 21 and 22 and support shafts 23b and 23c extending from each of both ends of the planet gear 23.

The carrier member 24 includes: one end wall 53 for supporting one support shaft 23b of each planet gear 23; an alternate end wall 54 for supporting the other support shaft 23c of each planet gear 23; and an interconnecting portion 55 for rotatably interconnecting together the one end wall 53 and the alternate end wall 54.

On the one end wall 53 of the carrier member 24, an insert hole 57 into which the third shaft 13 is inserted and support-shaft supporting holes 58 into which the one support shaft 23b of each planet gear 23 is respectively inserted are formed.

The insert hole 57 freely rotatably supports the third shaft 13 via a fourth bearing 59 (see FIG. 2) formed by a rolling bearing such as a roller bearing.

The number of support-shaft supporting holes 58 to be provided is two, which is a number corresponding to the number of planet gears 23. Each support-shaft supporting hole 58 freely rotatably supports the support shaft 23b of the planet gear 23 via a fifth bearing 60 formed by a rolling bearing such as a roller bearing.

At one end of the one end wall 53, an annular rib 61 is formed. The rib 61 is supported freely rotatably by the second annular portion 48 (see FIG. 2) of the second portion 262 of the housing 26, via a sixth bearing 62 formed by a rolling bearing such as a deep groove ball bearing.

As one of the characteristics of this embodiment, between a pair of end walls 53 and 54 of the carrier member 24, a lubricant splattering preventive cover 56 being an encircling member is provided.

Figure 5:
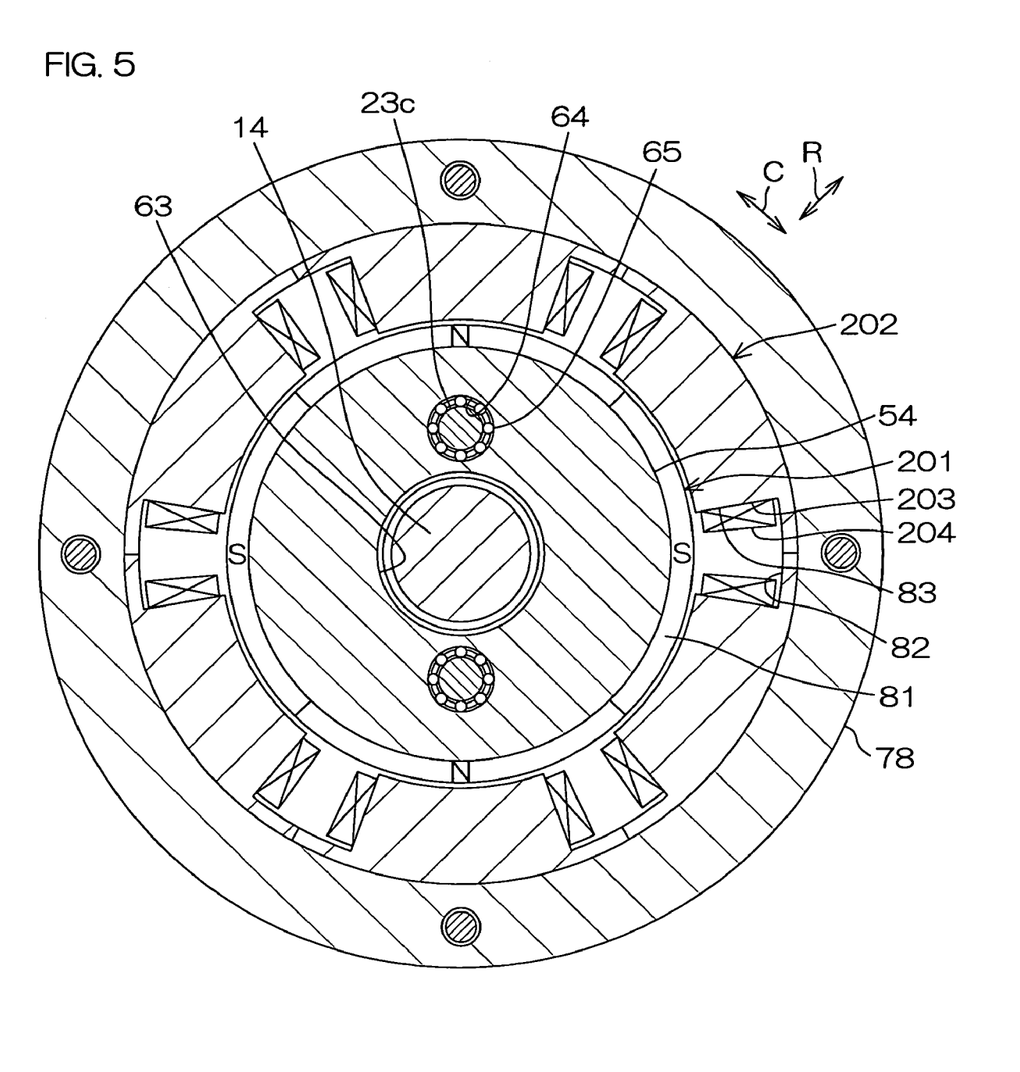
FIG. 5 is a cross-sectional view taken along line V to V of FIG. 2.

FIG. 5 is a cross-sectional view taken along line V to V of FIG. 2. With reference to FIG. 2 and FIG. 5, the alternate end wall 54 of the carrier member 24 is formed with an insert hole 63 into which the fourth shaft 14 is inserted and a support-shaft supporting holes 64 into which the other support shaft 23c of each planet gear 23 is respectively inserted.

There are provided two support-shaft supporting holes 64, of which the number corresponds to the number of the planet gears 23. Each support-shaft supporting hole 64 freely rotatably supports the support shaft 23c of the planet gear 23 via a seventh bearing 65 formed by a rolling bearing such as a roller bearing.

With reference to FIG. 3 and FIG. 4, a plurality (in this embodiment, two) of interconnecting portions 55 are provided in the circumferential direction C with equal spacing. The interconnecting portions 55 are formed integrally with the alternate end wall 54 by using a single member and the cross section thereof is in a sector shape. It is noted that the interconnecting portion 55 and the alternate end wall 54 may be formed separately, and the both components may be fixed by using a bolt, etc., with each other.

With respect to the radial direction R, positions of the interconnecting portions 55 and those of the tooth portions 23a of the planet gear 23 overlap each other. With respect to the circumferential direction C, the interconnecting portions 55 and the tooth portions 23a of the planet gear 23 are arranged one after another. Thereby, in a dead space in which no planet gears 23 are arranged in the space between a pair of end walls 53 and 54, the interconnecting portions 55 can be arranged, and as a result, reduction in the size of the carrier member 24 can be achieved.

At one end of each interconnecting portion 55, a flange portion 66 is formed. On the alternate end wall 53, flange portions 67 are each formed at positions corresponding to those of the flange portions 66. That is, the corresponding flange portions 66 and 67 are abutted against each other.

The flange portion 67 is formed with a pair of insert holes 68 at positions apart in the circumferential direction C. Between each pair of insert holes 68, a fitting hole 71 into which a positioning pin 69 is fitted is formed. In each flange portion 66 of the interconnecting portion 55, a screw hole 72 is formed at a position corresponding to that of the insert hole 68 of the flange portion 67. In the flange portion 66, a fitting hole 73 is formed at a position corresponding to that of the fitting hole 71 of the flange portion 67.

A screw 74 being a fastening member that is inserted into each insert hole 68 is threaded onto the corresponding screw hole 72, and thereby, the flange portion 66 and the corresponding flange portion 67 are coupled to each other. By the pin 69 fitted into each fitting hole 71 and the corresponding fitting hole 73, the positioning of the circumferential direction C between the flange portions 66 and 67 is determined. The pin 69 is a tapered pin of which the diameter is gradually reduced as it advances toward the other side S2 of the axial direction S, and an inner peripheral surface of each of the fitting holes 71 and 73 is formed into a shape that matches the outer peripheral surface of the pin 69.

When the pin 69 is used, it becomes possible to highly accurately achieve the mutual positioning of a pair of end walls 53 and 54 with respect to the circumferential direction C at the time of manufacturing the carrier member 24. More specifically, at the time of manufacturing the carrier member 24, a manufacture intermediate body of which the portion corresponding to a pair of end walls 53 and 54 and the interconnecting portion 55 of the carrier member 24 is formed integrally by a single member is prepared. The fitting holes 71 and 73 for the pin 69 and the bearing holding holes 58 and 64 for the support shafts 23b and 23c are formed in the manufacture intermediate body, and thereafter, the manufacture intermediate body is cut at a borderline portion between a portion corresponding to the interconnecting portion 55 and a portion corresponding to one end wall 53, and interiors of each of the cut members are individually machined.

Thereby, when the interconnecting portion 55 and the one end wall 53 are mutually positioned, the pin 69 is fitted into each fitting hole 71 and 73. As a result, the both components can be positioned highly accurately with respect to the circumferential direction C. Therefore, the degree of parallelization of the axes of each gear 21, 22, and 23 can be increased.

When the carrier member 24 is a two-dividable structure formed by: the one end wall 53; and the interconnecting portions 55 and the other-end wall 54, the planet gear 23 can be assembled in a state that the one end wall 53 is removed from the interconnecting portions 55, which facilitates an assembly work. Further, the respective two-dividable portions can be individually machined, and thus, the degree of freedom in a machining work increases, and as a result, the machining work can be facilitated. Resulting from a reduction in the cost for the machining work, a manufacturing cost can be reduced.

The lubricant splattering preventive cover 56 serves to prevent lubricant imparted to the first sun gear 21, the second sun gear 22, and each planet gear 23 from splattering to surrounding areas of the gears 21 to 23. For the lubricant, grease which is semisolid lubricant, and lubricating oil which is liquid lubricant can be exemplified.

The lubricant splattering preventive cover 56 is arranged between a pair of end walls 53 and 54 of the carrier member 24. The lubricant splattering preventive cover 56 is formed by converting a thin plate into an annular shape, and formed separately with the carrier member 24. When the thickness of the lubricant splattering preventative cover 56 is relatively decreased, a light weight can be achieved. When the thickness of the carrier member 24 is relatively increased, the strength of the carrier member 24 can be secured.

With respect to the axial direction S, the lubricant splattering preventive cover 56 covers an overall area of the tooth portion 23a of each planet gear 23, the first sun gear 21, and the second sun gear 22. With respect to the circumferential direction C, the lubricant splattering preventive cover 56 continuously surrounds across an overall area of an outer periphery of the tooth portion 23a of each planet gear 23, the first sun gear 21, and the second sun gear 22.

One end of the lubricant splattering preventive cover 56 contacts an end surface 75 of the one end wall 53 opposite to each other. The other end of the lubricant splattering preventive cover 56 is fixed by welding, or other means, to an end surface 76 of the other-end wall 54 opposite to each other. When the lubricant oil is used as the lubricant, a sealing member for liquid-tightly sealing a space between the one end of the lubricant splattering preventive cover 56 and the end surface 75 may be provided.

The lubricant splattering preventive cover 56 is elongated in one direction along the radial direction R, and is in a shape in which the intermediate portion in the lengthwise direction is constricted. The lubricant splattering preventive cover 56 includes: a first portion 56a arranged close to the outer periphery of each sun gear 21 and 22; and second portions 56b and 56b arranged close to the outer periphery of the corresponding planet gear 23.

The first portion 56a is arranged between each sun gear 21 and 22 and the connection portion 55, and is formed in an arc shape that is concentric with each of the sun gears 21 and 22. The second portions 56b are each formed in an arc shape that is concentric with the corresponding planet gear 23. A gap between the first portion 56a of the lubricant splattering preventive cover 56 and each of the sun gears 21 and 22, and a gap d between the second portions 56b and the corresponding planet gears 23 is set to predetermined ranges d1 and d2. More specifically, the lower limit d1 of these gaps is set to a level at which the lubricant can circulate between each gear 21 to 23 and the lubricant splattering preventive cover 56 when each gear 21 to 23 is driven. The upper limit d2 of the gaps is set to a level at which the lubricant remaining inside the lubricant splattering preventive cover 56 can penetrate into each gear 21 to 23. A lower limit d1 0.5 mm of the gaps, whereas the upper limit d2 2 mm of the gaps are exemplified.

The first and second portions 56a and 56b are connected to each other via constricted portions 56c. Each constricted portion 56c is constricted in a manner to stay close to a meshing region B of each gear 21 to 23. The provision of the constricted portion 56c enables a more ensured prevention of splattering of the lubricant in the meshing region B of each gear 21 to 23.

With reference to FIG. 2 and FIG. 3, the lubricant splattering preventive cover 56 and a pair of end walls 53 and 54 each arranged at a pair of ends of the lubricant splattering preventive cover 56 form a closed space 77 within the carrier member 24. In the space 77, the first sun gear 21, the second sun gear 22, and the planet gears 23 are accommodated.

The second portion 262 of the housing 26 includes a third annular portion 78 interconnected to both the first and second annular portions 47 and 48. The third annular portion 78 configures one portion of the outer peripheral wall of the second portion 262.

On the inside of the third annular portion 78, a large-diameter groove 79 of which the diameter is relatively large is defined, and on the inside of the second annular portion 48, a small-diameter groove 80 of which the diameter is relatively small is defined. The large-diameter groove 79 and the small-diameter groove 80 are communicated to each other, and are opened to the other side S2 of the axial direction S.

The small-diameter groove 80 accommodates the one end wall 53 of the carrier member 24, one portion of the lubricant splattering preventive cover 56, and one portion of each planet gear 23. The large-diameter groove 79 accommodates the remaining portion of the lubricant splattering preventive cover 56, the remaining portion of each planet gear 23, the other end wall 54 of the carrier member 24, and the transmission-ratio varying motor 20.

With reference to FIG. 2 and FIG. 5, the rotor 201 of the transmission-ratio varying motor 20 includes the permanent magnet 81 fixed to the other end wall 54 of the carrier member 24. The permanent magnet 81 has magnetic poles of which the polarities alternately differ in the circumferential direction C, and is arranged with N-poles and S-poles one after another with equal spacing with respect to the circumferential direction C. The permanent magnet 81 may be a segment magnet in which a plurality of magnets in an arc shape are annularly aligned, or an annular ring magnet.

The stator 202 of the transmission-ratio varying motor 20 includes a stator core 203 formed by stacking a plurality of layers of electromagnetic steel plates in the axial direction S, and an electromagnetic coil 204.

The stator core 203 includes a torus-shaped yoke 82 and a plurality of teeth 83 arranged with equal spacing in the circumferential direction C and protruding from the yoke 82 inwardly of the radial direction R. An outer peripheral surface of the yoke 82 is fixed by being shrink-fit, for example, to an inner peripheral surface of the third annular portion 78 of the housing 26. The housing 26 serves also as the housing of the transmission-ratio varying motor 20. The teeth 83 are arranged in the circumferential direction C with equal spacing. The electromagnetic coil 204 is wound around each of the teeth 83. Each of the teeth 83 faces the permanent magnet 81 across an overall area of the axial direction S.

As one of the characteristics of this embodiment, at least one position of at least one of the torque controlling motor 25 and the transmission-ratio varying motor 20 overlaps the position of the planet gear mechanism 19 with respect to the axial direction S.

More specifically, in the annular groove 44 formed on the inside of the outer cylinder portion 41 of the rotor 251 of the torque controlling motor 25, at least one portion (in this embodiment, the one end wall 53 of the carrier member 24 and one portion of each planet gear 23) of the planet gear mechanism 19 is accommodated. Thereby, the position of one portion of the torque controlling motor 25 overlaps the position of the planet gear mechanism 19 with respect to the axial direction S.

It is noted that the carrier member 24 maybe deviated, for example, to the one side S1 of the axial direction S to overlap the position of the torque controlling motor 25 on the position of the planet gear mechanism 19 across an overall area of the axial direction S.

The transmission-ratio varying motor 20 surrounds the other end wall 54 of the carrier member 24 outwardly of the radial direction R. Thereby, the overall area of the axial direction S of the transmission-ratio varying motor 20 overlaps the position of the carrier member 24.

The position of the transmission-ratio varying motor 20 may be offset to the other side S2 of the axial direction S to allow only one portion of the position of the transmission-ratio varying motor 20 to be overlapped the position of the carrier member 24 (planet gear mechanism 19) in the axial direction S.

Either one of the position of the torque controlling motor 25 or that of the transmission-ratio varying motor 20 may be overlapped the position of the planet gear mechanism 19 in the axial direction S so as to prevent the other positions from being overlapped the position of the planet gear mechanism 19 in the axial direction S.

From the other end wall 54 of the carrier member 24, a hollow support shaft 84 is extended. One end of the support shaft 84 is rotatable together with the other end wall 54, and the other end of the support shaft 84 is supported freely rotatably by the third portion 263 of the housing 26 via an eighth bearing 85 formed by a rolling bearing such as a deep groove ball bearing. An intermediate portion of the support shaft 84 is interconnected rotatably together with a rotor 341 of the carrier-member rotation-angle sensor 34. A stator 342 of the carrier-member rotation-angle sensor 34 surrounds the rotor 341, and is held by the third portion 263 of the housing 26.

An intermediate portion of the fourth shaft 14 is supported freely rotatably by the third portion 263 of the housing 26 via a ninth bearing 86 formed of a rolling bearing such as a deep groove ball bearing.

Thus, according to this embodiment, both the torque controlling motor 25 and the transmission-ratio varying motor 20 can be formed in an annular shape that is concentric to the steering shaft 3. This eliminates the need for arranging each motor 25 and 20 to face each other by sandwiching the steering shaft 3 therebetween, and thus, a space occupied by the motors 25 and 20 can be reduced with respect to the radial direction R. As a result, reduction in the size of the steering apparatus for a motor vehicle 1 can be achieved.

When the position of at least one portion of at least one of the torque controlling motor 25 and the transmission-ratio varying motor 20 overlaps the position of the planet gear mechanism 19 in the axial direction S, it becomes possible to shorten the entire length of the steering apparatus for a motor vehicle 1 with respect to the axial direction S, which enables achieving a further reduction in the size of the steering apparatus for a motor vehicle 1.

Resulting from the reduction in the size of the steering apparatus for a motor vehicle 1, the manufacturing cost of the steering apparatus for a motor vehicle 1 can be decreased and a mounting performance onto a motor vehicle can also be improved.

Further, the first and second sun gears 21 and 22 of the planet gear mechanism 19 are arranged on the inside of an orbital revolution of the planet gears 23. Thereby, the planet gear mechanism 19 can be reduced in size.

When at least one portion of the planet gear mechanism 19 is accommodated in the annular groove 44 formed on the inside of the outer cylinder portion 41 of the rotor 251 of the torque controlling motor 25, the torque controlling motor 25 becomes able to surround at least one portion of the planet gear mechanism 19. As a result, it becomes possible to reduce in size the steering apparatus for a motor vehicle 1 with respect to the axial direction S. The torque controlling motor 25 can be used as a sound-proof member for preventing propagation of a drive noise of the planet gear mechanism 19, and as a result, the noise of the steering apparatus for a motor vehicle 1 can be decreased.

Further, the splattering of the lubricant applied to each gear 21 to 23 of the planet gear mechanism 19 can be prevented by the lubricant splattering preventative cover 56. Thereby, lubrication of the planet gear mechanism 19 can be maintained for a long period of time. That is, the lubrication of each gear 21 to 23 can be desirably maintained for a long period of time. As a result of improvement of the lubricating performance to each gear 21 to 23, the intensity of each gear 21 to 23 can be improved, and by extension, a reduction in the size and a decrease in the manufacturing cost of each gear 21 to 23 can be achieved. Further, it is possible to prevent the lubricant from intruding inside of the transmission-ratio varying motor 20, the carrier-member rotation-angle sensor 34, etc.

As a result of forming the lubricant splattering preventative cover 56 in a thin plate, the lubricant splattering preventative cover 56 can be made lighter. Further, as a result of the lubricant splattering preventative cover 56 being surrounding across an overall area of the outer periphery of each gear 21 to 23, the splattering of the lubricant can be more securely prevented.

The provision of the lubricant splattering preventative cover 56 in the carrier member 24 permits the arrangement of the lubricant splattering preventative cover 56 closer to the outer peripheries of the first and second sun gears 21 and 22 or the planet gear 23. As a result, the splattering of the lubricant can be more securely prevented.

The lubricant splattering preventative cover 56 can be further reduced in size. More specifically, when the lubricant splattering preventative cover is provided in a housing, etc., for supporting the carrier member, there is the need for arranging the cover outside the orbital revolution of the planet gear so that the cover does not contact the planet gear. On the other hand, as in this embodiment, when the lubricant splattering preventative cover 56 is provided in the carrier member 24, the lubricant splattering preventative cover 56, together with the planet gear 23, rotates around the first and second sun gears 21 and 22. Thus, the lubricant splattering preventative cover 56 can be arranged within the orbital revolution of the planet gears 23.

In the space 77 defined by the lubricant splattering preventative cover 56 and a pair of end walls 53 and 54 of the carrier member 24, the first sun gear 21, the second sun gear 22, and the planet gears 23 are accommodated. Thereby, the splattering of the lubricant outside the space 77 can be prevented, and thus, the lubrication of each gear 21 to 23 can be more securely maintained.

The present invention is not limited to the content of the embodiment described above, and various modifications within the scope of the present invention can be adopted.

For example, as a differential mechanism, instead of each of the gears (the first sun gear 21, the second sun gear 22, and the planet gears 23) of the planet gear mechanism 19, a traction drive mechanism using rollers (a first sun roller, a second sun roller, and a planet roller) may be used. In this case, as the lubricant, hydraulic lubricant is used, and a rotation transmission between the planet roller and the corresponding sun roller is performed via the hydraulic lubricant. As the differential mechanism, another mechanism such as a harmonic gear mechanism may be used. The present invention may be applied to another steering apparatus for a motor vehicle using a differential mechanism.

While the invention has been described in detail by way of concrete embodiments, it should be appreciated that modifications, alterations, and equivalents readily occur to those skilled in the art who understand the contents of the description above. The scope of the invention, therefore, is limited solely by the scope of the appended claims and equivalents thereof.

The present application is based on Japanese Patent Application No. 2007-274469 filed with Japanese Patent Office on Oct. 22, 2007, and the whole disclosure thereof is incorporated herein by reference.

What is claimed is:

1. A steering apparatus for a motor vehicle, comprising:
an input shaft interconnected to a steering member;
an output shaft interconnected to steerable wheels;
a differential mechanism for setting a transmission ratio from the input shaft to the output shaft by coaxially interconnecting the input shaft and the output shaft, the differential mechanism including a planet transmission mechanism, that has:
a first sun element interconnected to the input shaft;
a second sun element interconnected to the output shaft;
a planet element engaged with both the first sun element and the second sun element so as to permit rotation transmission therebetween; and
a carrier member for holding the planet element so as to permit rotation of the planet element and so as to permit revolution of the planet element around the first sun element and the second sun element;
a torque controlling motor interconnected to the input shaft; and
a transmission-ratio varying motor, interconnected to the differential mechanism, for driving the differential mechanism, and rotating and driving the carrier member;
wherein at least one portion of the torque controlling motor and/or at least one portion of the transmission-ratio varying motor overlap one portion of the differential mechanism with respect to a direction along an axis of the input shaft,
the torque controlling motor is arranged coaxially with the input shaft,
the transmission-ratio varying motor is arranged coaxially with the differential mechanism; and
an annular groove is defined on an inside of an outer cylinder portion of a rotor of the torque controlling motor, and a first end wall axially supporting one end of the planet element and one portion of the planet element are accommodated in the annular groove.

2. A steering apparatus for a motor vehicle according to claim 1,
wherein in the annular groove, one portion of the differential mechanism is accommodated.

3. A steering apparatus for a motor vehicle according to claim 1,
wherein an overall area of the transmission-ratio varying motor overlaps the one portion of the differential mechanism with respect to the direction along the axis of the input shaft.

4. A steering apparatus for a motor vehicle, comprising:
an input shaft interconnected to a steering member;
an output shaft interconnected to steerable wheels;
a differential mechanism for setting a transmission ratio from the input shaft to the output shaft by coaxially interconnecting the input shaft and the output shaft, the differential mechanism including a planet transmission mechanism, that has:
a first sun element interconnected to the input shaft;
a second sun element interconnected to the output shaft;
a planet element engaged with both the first sun element and the second sun element so as to permit rotation transmission therebetween; and
a carrier member for holding the planet element so as to permit rotation of the planet element and so as to permit revolution of the planet element around the first sun element and the second sun element;
a torque controlling motor interconnected to the input shaft; and
a transmission-ratio varying motor, interconnected to the differential mechanism, for driving the differential mechanism, and rotating and driving the carrier member
wherein at least one portion of the torque controlling motor and/or at least one portion of the transmission-ratio varying motor overlap one portion of the differential mechanism with respect to a direction along an axis of the input shaft,
the torque controlling motor is arranged coaxially with the input shaft, and
the transmission-ratio varying motor is arranged coaxially with the differential mechanism;
wherein an overall area of the transmission-ratio varying motor overlaps a second end wall axially supporting one end of the planet element and one portion of the planet element with respect to the direction along the axis of the input shaft.

5. A steering apparatus for a motor vehicle, comprising:
an input shaft interconnected to a steering member;
an output shaft interconnected to steerable wheels;
a differential mechanism for setting a transmission ratio from the input shaft to the output shaft by coaxially interconnecting the input shaft and the output shaft, the differential mechanism including a planet transmission mechanism, that has:
a first sun element interconnected to the input shaft;
a second sun element interconnected to the output shaft;
a planet element engaged with both the first sun element and the second sun element so as to permit rotation transmission therebetween; and
a carrier member for holding the planet element so as to permit rotation of the planet element and so as to permit revolution of the planet element around the first sun element and the second sun element;
a torque controlling motor interconnected to the input shaft; and
a transmission-ratio varying motor, interconnected to the differential mechanism, for driving the differential mechanism, and rotating and driving the carrier member;

wherein at least one portion of the torque controlling motor and/or at least one portion of the transmission-ratio varying motor overlap one portion of the differential mechanism with respect to a direction along an axis of the input shaft, the torque controlling motor is arranged coaxially with the input shaft, and the transmission-ratio varying motor is arranged coaxially with the differential mechanism, wherein the carrier member comprises a first end wall for axially supporting one end of the planet element and a second end wall for axially supporting an alternate end of the planet element, and the carrier member further comprises an encircling member, arranged between the first end wall and the second end wall, for encircling, in a liquid-tight manner, the first sun element, the second sun element, and the planet element.

6. A steering apparatus for a motor vehicle according to claim 5, wherein an inner surface of the encircling member, kept apart by a predetermined gap from an outer periphery, is formed along the outer periphery of the first sun element, the second sun element, and the planet element.

* * * * *